US010116826B1

(12) United States Patent
Ravikiran et al.

(10) Patent No.: US 10,116,826 B1
(45) Date of Patent: Oct. 30, 2018

(54) METHOD AND APPARATUS FOR AUTOMATICALLY RESUMING A PRINT JOB FROM PORTABLE MEMORY DEVICE

(71) Applicant: Xerox Corporation, Norwalk, CT (US)

(72) Inventors: Bondugula Ravikiran, Telangana (IN); Sainarayanan Gopalakrishnan, Chennai (IN); Srinivasarao Bindana, Andhra Pradesh (IN); Sivanandha Reddy Padiri, Andhra Pradesh (IN); Muralidaran Krishnasamy, Tamil Nadu (IN); Sathish Kumar Annamalai Thangaraj, Tamil Nadu (IN); Narayan Kesavan, Tamil Nadu (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/497,512

(22) Filed: Apr. 26, 2017

(51) Int. Cl.
    *H04N 1/04* (2006.01)
    *H04N 1/21* (2006.01)
    *H04N 1/00* (2006.01)
    *G06F 3/12* (2006.01)
    *G06K 15/02* (2006.01)

(52) U.S. Cl.
    CPC ......... *H04N 1/2166* (2013.01); *G06F 3/1236* (2013.01); *G06F 3/1275* (2013.01); *G06F 3/1286* (2013.01); *G06K 15/02* (2013.01); *H04N 1/00007* (2013.01); *H04N 1/00037* (2013.01); *H04N 1/00411* (2013.01); *H04N 2201/0094* (2013.01); *H04N 2201/3274* (2013.01)

(58) Field of Classification Search
    CPC ......... H04N 2201/0094; H04N 1/6019; H04N 2201/3274; H04N 7/152; G06F 3/1292; G06F 3/1267; G06F 3/1286; G06F 3/1293; G06F 2213/0042; G06F 3/0416; G06F 9/44526
    USPC .... 358/1.15, 1.12, 1.14, 1.2, 1.11, 1.13, 1.9, 358/504, 519, 520; 709/203
    See application file for complete search history.

(56) References Cited

U.S. PATENT DOCUMENTS

| 5,860,066 | A | 1/1999 | Rouse |
| 5,969,826 | A | 10/1999 | Dash et al. |
| 7,844,749 | B2 | 11/2010 | Tredoux et al. |
| 7,869,063 | B2 * | 1/2011 | Fukano ............... G06F 3/1218 358/1.1 |
| RE42,290 | E | 4/2011 | Ogino |

(Continued)

*Primary Examiner* — Negussie Worku
(74) *Attorney, Agent, or Firm* — Fox Rothschild LLP (57) ABSTRACT

A document printing system may include one or more print devices, each is capable of detecting a portable memory device, and also detecting a document file and associated configuration file stored in the portable memory device, where the configuration file may contain information about an interruption of a print job associated with the document file. The interruption may have occurred previously on any of the print devices. Each print device may extract and use the information from the configuration file, to automatically resume the previously interrupted print job. Each print device may also be capable of detecting an interruption of a current print job and recording information about the interruption in the configuration file stored in the portable memory device. In some embodiments, the information about the interruption of the print job may include a page number, cause of the interruption and/or job attributes of the interrupted print job.

20 Claims, 7 Drawing Sheets

(56) References Cited

U.S. PATENT DOCUMENTS

| | | | |
|---|---|---|---|
| 7,933,035 B2* | 4/2011 | Okada | G06F 3/1208 270/58.07 |
| 7,952,731 B2* | 5/2011 | Utsunomiya | G03G 15/5062 358/1.13 |
| 7,969,593 B2* | 6/2011 | Toda | G06F 3/1204 358/1.13 |
| 8,115,949 B2* | 2/2012 | Toda | G06F 3/121 358/1.13 |
| 8,441,666 B2* | 5/2013 | Tomii | G06F 3/121 358/1.1 |
| 8,599,395 B2* | 12/2013 | Sasakura | G06F 3/1215 358/1.1 |
| 8,817,319 B2 | 8/2014 | Martin | |
| 9,009,359 B2 | 4/2015 | Ashok et al. | |
| 9,185,245 B2 | 11/2015 | Miyachi et al. | |
| 9,245,130 B2 | 1/2016 | Ashok et al. | |
| 9,245,131 B2 | 1/2016 | Ashok et al. | |
| 9,661,170 B2* | 5/2017 | Mitsuyama | H04N 1/00915 |
| 9,674,383 B2* | 6/2017 | Suzuki | H04N 1/00687 |
| 9,727,288 B2 | 8/2017 | Kesavan et al. | |
| 9,740,447 B1 | 8/2017 | Krishnasamy et al. | |
| 9,800,752 B2* | 10/2017 | Hirasawa | H04N 1/0097 |
| 2005/0051942 A1 | 3/2005 | Kubo et al. | |
| 2006/0132841 A1 | 6/2006 | Park et al. | |
| 2006/0221372 A1 | 10/2006 | Onishi et al. | |
| 2006/0268310 A1* | 11/2006 | Tamai | H04N 1/00915 358/1.14 |
| 2007/0109600 A1 | 5/2007 | Ren et al. | |
| 2007/0229899 A1 | 10/2007 | Okuda | |
| 2008/0080001 A1* | 4/2008 | Yamada | H04N 1/00347 358/1.15 |
| 2008/0198412 A1 | 8/2008 | Yamada | |
| 2009/0128862 A1 | 5/2009 | Nolepa et al. | |
| 2009/0241120 A1 | 9/2009 | Nam et al. | |
| 2010/0188682 A1* | 7/2010 | Shirai | H04N 1/4413 358/1.13 |
| 2010/0231968 A1 | 9/2010 | Hirasawa et al. | |
| 2011/0085205 A1 | 4/2011 | Ouchi | |
| 2011/0090533 A1 | 4/2011 | Shimizu | |
| 2011/0242580 A1 | 10/2011 | Tran | |
| 2011/0292430 A1 | 12/2011 | Kang et al. | |
| 2012/0069375 A1 | 3/2012 | Sasakura | |
| 2012/0140266 A1 | 6/2012 | Takayama | |
| 2012/0158956 A1* | 6/2012 | Sako | G06F 11/3006 709/224 |
| 2012/0194850 A1 | 8/2012 | K. et al. | |
| 2012/0218605 A1 | 8/2012 | Yamada | |
| 2012/0257232 A1 | 10/2012 | Koike | |
| 2012/0307316 A1 | 12/2012 | De Muelenaere et al. | |
| 2013/0120799 A1 | 5/2013 | Maeda | |
| 2016/0086068 A1 | 3/2016 | Nakamura | |
| 2016/0241736 A1 | 8/2016 | Saluja et al. | |
| 2016/0253130 A1 | 9/2016 | Rajalingam et al. | |
| 2017/0139652 A1 | 5/2017 | Kesavan et al. | |

* cited by examiner

METHOD AND APPARATUS FOR AUTOMATICALLY RESUMING A PRINT JOB FROM PORTABLE MEMORY DEVICE

BACKGROUND

This disclosure relates to a system for automatically printing documents that are stored on a portable memory device with little or no user activation of a local user interface (LUI), other than to connect the portable memory device to a printer.

In performing a conventional print job in a document system or a multi-function peripheral (MFP), such as sending a file to the printer via a network or plugging in a universal serial bus (USB) drive to a printer, a user normally needs to perform several steps. For example, in a conventional print job in a networked environment, the user needs to send a print job from a computer and walk to the printer to retrieve the printed document. In another example, the user plugs into the printer a USB or other media card that stores documents to be printed. The user needs to use the LUI to browse the file directory on the USB card and select the files to be printed.

There are other scenarios when a print job fails to complete for various reasons, such as machine error or low resource condition, in which the user often has to switch to another device and reconfigure the job manually to print only remaining document pages, or to allow the system to automatically re-print the entire document which duplicates what has already been printed. Existing systems, including those that can print document files from a USB drive, may not have the capability of identifying an incomplete print job from the system itself or from another system and automatically resuming the remaining portion of the print job.

This document describes a system that may address at least some of the issues described above.

SUMMARY

In some embodiments, a document printing system may include a first print device, where the first print device may include a processing device, a print engine, a port configured to communicatively connect to a portable memory device, an event triggering circuit configured to detect that a portable memory device is communicatively connected to the port, and non-transitory computer readable storage medium containing programming instructions. The programming instructions may be executed to cause the processing device to detect a trigger event by determining that a portable memory device has become communicatively connected to the port of the first print device. Upon detecting the trigger event, the first print device may access a document file stored in the portable memory device.

In some embodiments, the first print device may detect whether a configuration file associated with the document file is stored in the portable memory device, and if the configuration file exists in the portable memory device, automatically print the document file. In some embodiments, the first print device may determine that the configuration file exists in the portable memory device. The first print device may also determine that the configuration file contains information about an interrupted print job of the document file, including at least a page number of the document at which interruption of the interrupted print job occurred, and then extract the page number from the configuration file, and cause the print engine of the first print device to automatically resume the interrupted print job from that page number. In some embodiments, the first print device may determine that the configuration file does not exist in the portable memory device, and then cause the print engine to automatically print the document from a first page of the document.

In some embodiments, the configuration file may also contain information about a cause of an interruption or job attributes of the interrupted print job. The first print device may additionally extract from the configuration file the information about the cause of the interruption or job attributes of the interrupted print job. The first print device may also use the extracted information to resume the interrupted print job. In some embodiments, the cause of the interruption of the interrupted print job may include, but not limited to, one or more of the following: paper jam, print medium not available, low toner, stapler empty or hole puncher not available.

In some embodiments, the first print device may be capable of detecting an interruption of a current print job of the document file. The print device may be configured to receive an indication of an interruption of a current print job of the document file stored in the portable memory device, and upon receiving the indication, create or update the configuration file in the portable memory device so that the configuration file records at least a current page number at which the current print job was interrupted. The first print device may also be configured to cause the configuration to record a cause of the interruption or job attributes of the interrupted current print job.

In some embodiments, the first print device may also compare the cause of the interruption or the job attributes of the interrupted print job with the status of the first print device to determine whether a condition that has caused the interruption of the interrupted print job is also present in the first print device. If the first print device determines that the condition that has caused the interruption of the interrupted print job exists in the first print device, the first print device may suspend resuming the interrupted print job.

In some embodiments, the document printing system may also include a second print device that may be configured to resume an interrupted print job that occurred in the first print device. The second print device may or may not be substantially identical to the first print device in terms of structures and functionalities. In some embodiments, the second print device may include a processing device, a print engine, a port configured to communicatively connect to the portable memory device, an event triggering circuit configured to detect that the portable memory device is communicatively connected to the port of the second print device, and non-transitory computer readable storage medium containing programming instructions. The programming instructions in the second print device may be executed to cause the processing device of the second print device to detect that the portable memory device has become communicatively connected to the port of the second print device and that the portable memory device contains the configuration file that includes the information about the interrupted print job. The second print device may extract from the configuration file at least the page number at which the interruption of the interrupted print job occurred, and automatically cause the print engine of the second print device to resume the interrupted print job from the page number at which the interruption occurred.

In some embodiments, the second print device may also be capable of receiving an indication of an interruption of a current print job of the document file stored in the portable memory device, and updating the configuration file in the portable memory device so that the configuration file records at least a current page number at which the current print job was interrupted. In some embodiments, the second print device may also record a cause of the interruption or job attributes of the interrupted current print job in the configuration file.

Various methods may be implemented in above illustrated embodiments of a document printing system to automatically print a document file or resume an interrupted print job. In some embodiments, a method may include detecting, by a processing device of a first print device, a trigger event by determining that a portable memory device has become communicatively connected to a port of the first print device. The method may also include, upon detecting the trigger event, accessing a document file stored in the portable memory device, detecting whether a configuration file is stored in the portable memory device, and if the configuration file exists in the portable memory device, automatically printing the document file. In printing the document file, the method may include: determining that the configuration file contains information about an interrupted print job of the document file, extracting, from the configuration file, at least a page number of the document at which the interruption of the interrupted print job occurred, and causing a print engine of the first print device to automatically resume the interrupted print job from the page number of the document at which the interruption occurred. If no configuration file exists in the portable memory device, the method may cause the print engine of the first print device to automatically print the document from a first page of the document.

In some embodiments, the method may include receiving by the first print device, an indication of an interruption of a current print job of the document file stored in the portable memory device, and upon receiving the indication, creating or updating the configuration file in the portable memory device so that the configuration file records at least a current page number at which the current print job was interrupted. The method may also include recording a cause of the interruption of the current print job and/or job attributes of the interrupted current print job in the configuration file.

In some embodiments, if the configuration file exists in the portable memory device, before automatically printing the document file, the method may prompt a user for a selection of actions to which the first print device will respond. The actions that the method may prompt the user to select may include resuming the interrupted print job based on the information contained in the configuration file, deleting the configuration file and printing the document from a first page of the document, deleting the configuration file, or ignoring the configuration file.

In some embodiments, the method may also include, by a processing device of a second print device, detecting that the portable memory device has become communicatively connected to a port of the second print device and that the portable memory device contains the configuration file that includes the information about the interrupted print job, extracting from the configuration file at least the page number at which the interruption of the interrupted print job occurred, and automatically causing a print engine of the second print device to resume the interrupted print job from the page number at which the interruption occurred. In some embodiments, the method also include, by the processing device of the second print device, receiving an indication of an interruption of a current print job of the document file stored in the portable memory device, and updating the configuration file in the portable memory device so that the configuration file records at least a current page number at which the current print job was interrupted, and/or a cause of the interruption of the current print job or job attributes of the interrupted current print job.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

The term "local user interface" or "LUI" of a device refers to a user interface peripheral that is mounted to or built in an electronic device for users to perform various operations on the device. A local user interface typically includes a combination of hardware (such as a keyboard, keypad, touch-sensitive display and/or microphone) and software for presenting prompts to a user and receiving input from the user via the hardware.

The term "automatically" refers to causing a machine to perform an action without requiring any user interaction, such as requiring the user to push a button or enter a command, before the machine will perform the action.

The term "portable memory device" refers to a portable device that has a non-transitory storage medium capable of storing data, such as a universal serial bus (USB) flash drive, a secure digital (SD) card or microSD card, a portable hard disk, a portable media player or any other external storage device that has such storing capability. In various embodiments, the portable memory device does not need to include a processor. The portable memory device will typically have a file system. The portable memory device will include a data transfer device, such as a USB connector for a USB drive, input/output ports of an SD card or a radio unit (transceiver) of a near-field communication device such as a Bluetooth device.

A "computer" or "computing device" refers to a device that includes a processor or processing device, and non-transitory, computer-readable memory. The memory may contain programming instructions that, when executed by the processor, cause the computing device to perform one or more operations according to the programming instructions. Examples of computing devices include personal computers, servers, mainframes, gaming systems, televisions, and portable electronic devices such as smartphones, smart watches, wearable electronic devices, digital cameras, fitness tracking devices, tablet computers, laptop computers, media players and the like.

The term "physical document" refers to a hard-copy document on a substrate that is printed off of a printer or that can be scanned into a digital form. It may consist of a single sheet or a set of sheets.

The term "document system" refers to a system of devices that communicate with each other for handling document related jobs, in particular, printing, copying, electronic storing, facsimile, transmitting or receiving (including fax, email, or communicating with a remote device), and/or image scanning of a physical document.

The term "digital document file," "document file," "electronic document" or "electronic document file" refers to a digital representation of a document such as a word processor file, a PDF file, or a bitmap file (e.g. TIFF, JPG, PNG files etc.) that is stored in a computer readable memory or a storage medium. A document file may be an electronic representation of a physical document that contains one or multiple pages.

The term "print device" refers to a machine having hardware capable of receiving a digital document file and using the information from the file and associated print instructions to print the information from the file on a substrate and produce a physical document. Components of a print device typically include a print engine, which includes print hardware such as a print head, which may include components such as a print cartridge containing ink, toner or another print material, as well as a document feeding system configured to pass a substrate through the print device so that the print head can print characters and/or images on the substrate. In some embodiments, a print device may have additional capabilities such as scanning or faxing and thus may be a multifunction device.

A "print job" refers to a set of instructions that causes a print device to print one or more document files. In this patent document, the set of instructions may be provided by a user, or it may be generated by a system or the print device after detecting a trigger event.

The term "interruption of a print job" refers to a suspension of a print job in a print device. The suspension may occur in the middle of printing one document file before all of the pages of the document file are printed. The suspension may also occur in the middle of printing multiple document files before all of the documents are printed. The interruption may be caused by errors related to print engine, the network and the print device, such as paper jam, low toner, stapler empty, and/or print medium not available. The interruption may also be caused by user interruption. For example, the user may determine that the quality of the printout is low and decide to interrupt the current print job and change to a different printer or change the toner before resuming printing.

Figure 1:
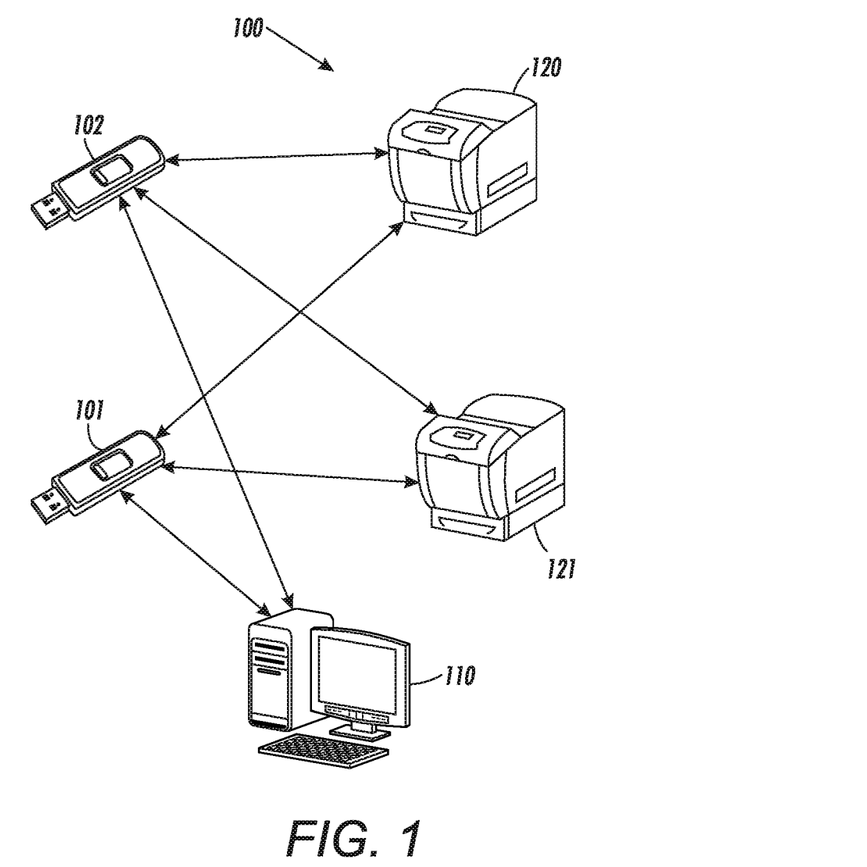
FIG. 1 illustrates a system for automatic printing of documents according to some embodiments.

With reference to FIG. 1, a document system 100 may include one or more print devices 120, 121, and/or computers 110. Each print device 120, 121 is capable of reading a portable memory device 101, 102 for instant printing of a document file. The portable memory device 101, 102 may store one or more digital document files in a designated folder, e.g. a folder with a designated filename such as the root folder or "\Insta-print." The portable memory device 101, 102 may also store print instructions therein for the print device to perform various print jobs. For example, the portable memory device may store print instructions in a file. The print device 120 may extract the print instructions from the portable memory device 101, 102 and print the one or more digital document files based on the print instructions. The designated folder of the portable memory device 101, 102 may also be used to store digital document files to be printed by one or more print devices 120, 121.

In some embodiments, the print device 120 may be capable of detecting a trigger event indicating that a portable memory device has become communicatively connected to the print device. For example, the print device 120 may detect a trigger event when a portable memory device is plugged into or otherwise communicatively coupled to the print device. The portable memory device may contain a folder of the designated name. Then, in response to detecting the trigger event, the print device may retrieve one or more digital document files stored in the designated folder of the portable memory device, and automatically start a print job. In doing so, the print device may read the print instructions from the portable memory device 101, 102 or the default print instructions from the print device itself and instantly print all of the retrieved digital document files. In some embodiments, the print device 120, 121 may be capable of recording an interruption of a print job in one print device and resuming the interrupted print job in the same or different print device.

Alternatively and/or additionally, the portable memory device 101, 102 may be pre-configured with default instructions by a computing device 110 via a web user interface (web-UI). Alternatively, the computing device 110 may be used to create the file system on the portable memory device. Additionally, the user may plug the portable memory device in a computer and re-configure the print instructions at any time.

Figure 2:
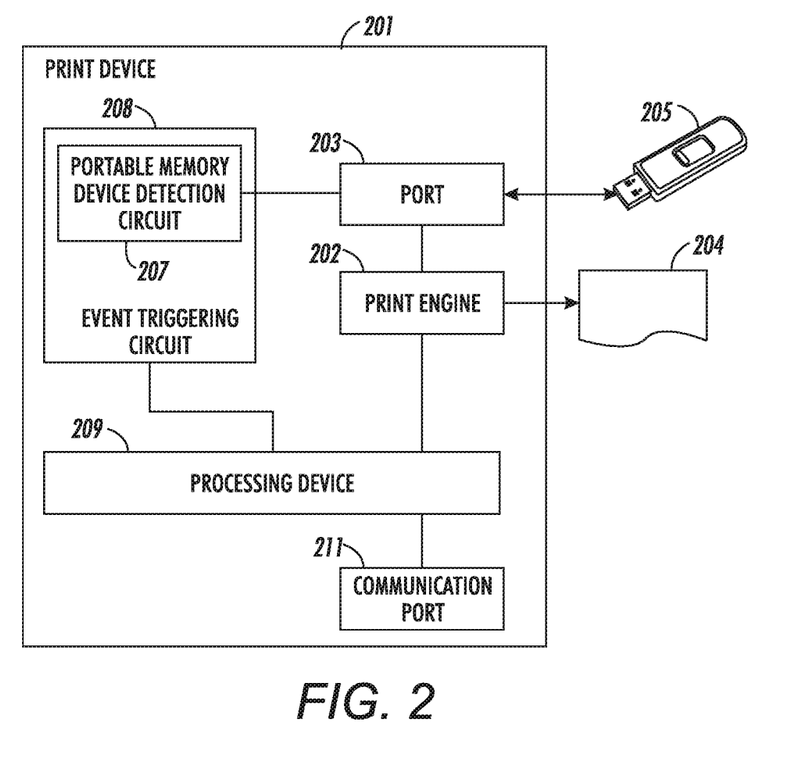
FIG. 2 illustrates a diagram of a print device according to some embodiments.

With reference to FIG. 2, various components in the print device 201 are described in detail according to some embodiments. In some embodiments, the print device 201 may include a processing device 209. The processing device 209 may be communicatively coupled to a communication port 211. The print device 201 may also include a port 203 for plugging in a portable memory device. Additionally, the print device may include an event triggering circuit 208 that triggers the print device to perform certain operations. The event triggering circuit may include a portable memory device detection circuit 207 that may be communicatively coupled to the port 203. When a portable memory device 205 is plugged into the port 203, the portable memory device detection circuit may detect the status change of the port and subsequently generate a trigger to the event trigger circuit, indicating that a portable memory device is plugged into the print device and digital document files and/or print instructions are available to retrieve from the portable memory device. Alternatively, a portable memory device may be communicatively coupled to the communication port 211 of the print device, and the print device may be capable of pairing with a portable memory device wirelessly, such as via Wi-Fi, Bluetooth or other near-field communication protocols. In some embodiments, the port 203 and the communication port 211 may be separate ports. In some embodiments, the port 203 and the communication port 211 may one single integrated port.

Figure 3:
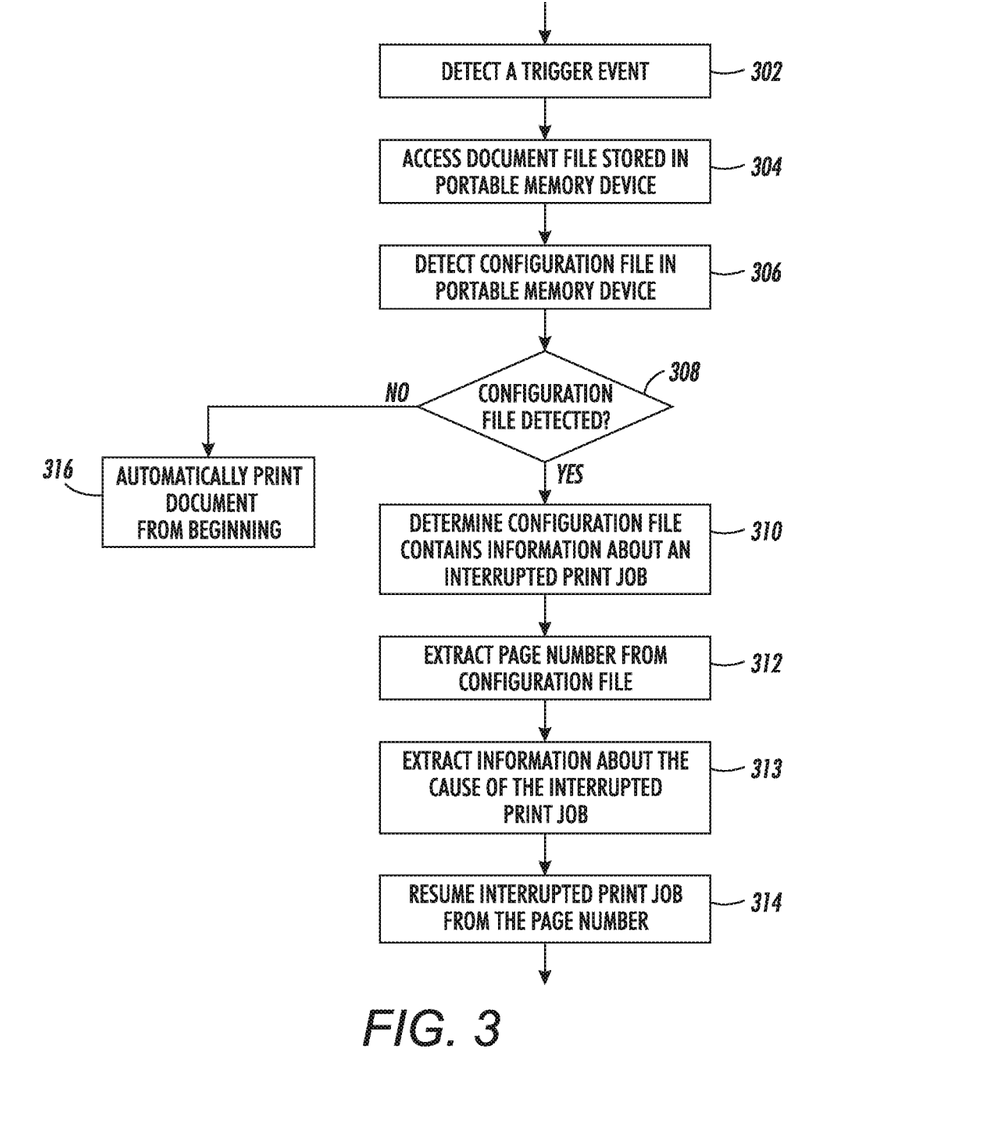
FIG. 3 illustrates a diagram of a process of resuming an interrupted print job according to some embodiments.

In FIG. 3, various embodiments for accomplishing various print jobs in the print device disclosed above are provided. In some embodiments, a method for automatically printing a document and resuming an interrupted print job may include detecting, by the processing device of the print device, a trigger event 302 by determining that a portable memory device has become communicatively connected to a port of the print device. Upon detecting the trigger event, the processing device of the print device may access a digital document file stored in the portable memory device 304, where the document file includes a digital representation of a document to be printed. The print device may further detect whether a configuration file is stored in the portable memory device 306, where the configuration file contains information about an interrupted print job of the document file.

In some embodiments, the configuration file may contain a page number at which the print job was interrupted. The configuration file may also contain information about the cause of the interruption of the print job, for example, paper jam, print medium not available, low toner, stapler empty, the hole puncher not available, or alike. The configuration file may also contain job attributes of the interrupted print job, for example, the print medium size, the print resolution, the finishing (e.g. single or double side, whether or not to staple, whether to sort and collate for multiple copies, which side to flip for double-side printing etc.) or other attributes associated with a print job. In some embodiments, the device may store the information in the configuration file in various ways. For example, the device may store the information in a text file, in an XML file format or in any other format.

In some embodiments, the information about the cause or job attributes of the interrupted print job may be stored in a file that is associated with the digital document file that has been printed and interrupted. For example, the portable memory device may store the configuration files for digital document files sample1.doc and sample2.doc in sample1.conf and sample2.conf, respectively. The device may store the digital document files and the associated configuration files in the same or different directory. Alternatively, and/or additionally, the device may store the configuration file as a single file, which includes an index entry to each of the digital document files which have experienced interruption in a previous print job. In an non-limiting example, the index entry may be a filename of the digital document file or the location of the digital document file in the portable memory device or on the network.

In some embodiments, the device may determine that no configuration file that contains information about an interrupted print job of the document file is detected from the portable memory device, then proceed to automatically printing the document file from the beginning 316, i.e. the first page of the document. Alternatively, the device may detect from the portable memory device a configuration file and determine that the configuration file contains information about an interrupted print job of the document file 310. The device may proceed to extract at least a page number of the document at which interruption of the interrupted print job occurred 312, and cause a print engine of the print device to automatically resume the interrupted print job from the extracted page number 314. Alternatively, and/or additionally, the device may also extract from the configuration file information about the cause of the interrupted print job or job attributes of the interrupted print job 313. The device may also use the information about the cause or job attributes of the interrupted print job and resume the print job.

In a non-limiting example, the user has plugged a USB flash drive into the print device. The USB flash drive may have a designated folder, e.g. "\insta-print" or any other names designated for storing digital document files to be printed. The print device will include program instructions configured to automatically take certain actions in response to detecting a trigger event indicating that a memory device with a file storage folder of the designated name has been communicatively connected to the print device. Once the print device detects the trigger event, the print device may identify the designated folder on the portable memory device e.g. "\insta-print," and retrieve the digital document sample1.doc from the designated folder. Alternatively and/or additionally, the designated folder may be a default folder or may be the root of the portable memory device file directory. The print device may also detect an associated configuration file, for example, by filename, such as sample1.conf, and extract from the configuration file sample1.conf a page number, e.g. page 23, indicating that a previous print job for the digital document file sample1.doc has been interrupted at page 23. The device may resume the previous print job for sample1.doc from page 23 without repeatedly printing the document file for pages 1 to 22. Alternatively, and/or additionally, the print device may also extract job attributes, for example, the print medium size or the finishing options, and use the same job attributes in the resumed print job. In some embodiments, upon completing a resumed print job, the print device may be configured to delete the configuration file associated with the document file that has just been completed, or delete information about the interrupted (and now resumed and completed) print job from the configuration file.

Figure 4:
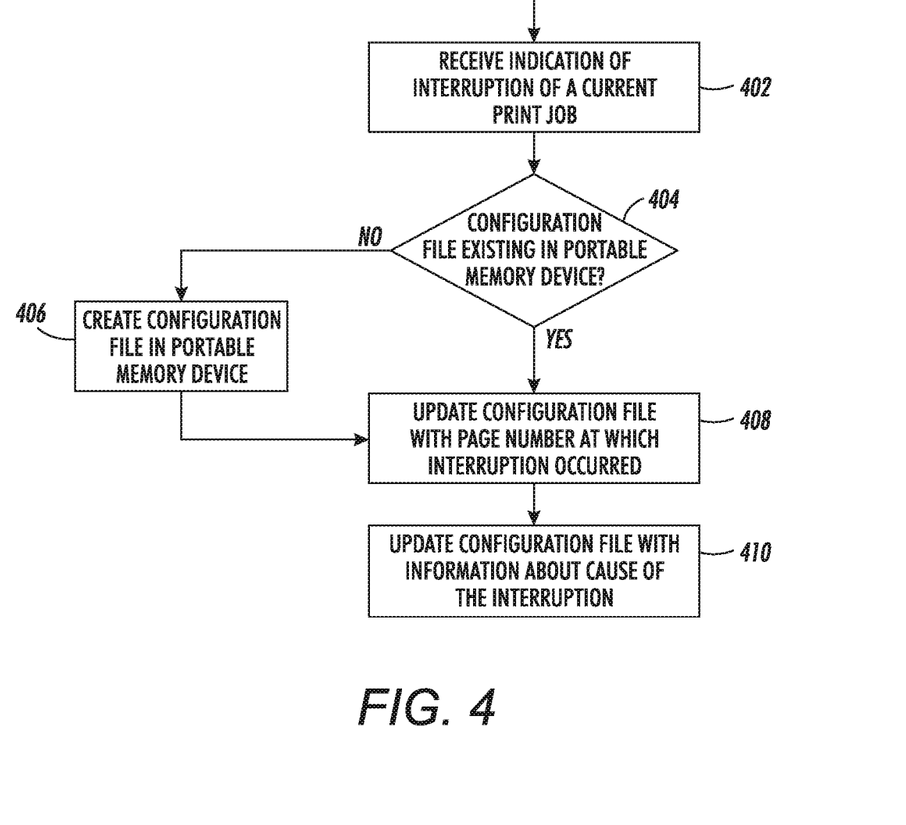
FIG. 4 illustrates a diagram of a process of processing an interruption of a print job according to some embodiments.

In FIG. 4, in some embodiments, while printing the document file stored in the portable memory device, the print device may be configured to receive an indication of an interruption of a current print job of the document file 402. Upon receiving the indication, the print device may record the page number of the document file at which the interruption occurred. Alternatively, and/or additionally, the device may also record a cause of the interruption and/or job attributes of the interrupted current print job. The print device may further be configured to determine whether a configuration file that contains information about the interruption of a print job associated with the document file exists in the portable memory device 404. If such configuration file does not exist in the portable memory device, the print device may create a configuration file in the portable memory device 406. If such configuration file does exist in the portable memory device, or if the new configuration file is created, the print device may create or update the configuration file so that the configuration file includes the page number at which interruption occurred 408. The print device may also update the configuration file with information about the cause of the interruption or job attributes of the interrupted print job 410.

In some embodiments, the methods described in embodiments of FIG. 4 may also be applied to a print device that resumes a previously interrupted print job. For example, while the print device is resuming a previously interrupted print job according to the above embodiments, the resumed print job is interrupted again. The print device may be configured to detect the second-time interrupted job and update the configuration file according to various steps described in embodiments of FIG. 4.

Alternatively, and/or additionally, in resuming an interrupted print job, the print device may be configured to extract from the configuration file the page number at which the interruption occurred, information about the cause of the interruption and/or job attributes of the interrupted print job. The print device may compare these extracted information with the status of the print device to determine whether a condition that has caused the interruption of the print job is also present in the print device. For example, if the print device determines that the cause of the interruption of the print job was due to an appropriate print medium not available, the print device may examine the print medium size parameter of the interrupted print job in the job attributes to ensure that the required size of print media for the interrupted print job is available in the print device. If the print device determines that the condition that has caused the interruption of the print job also exists in the print device, for example, the print medium size is also not available, then the print device may suspend resuming the interrupted print job.

Figure 5:
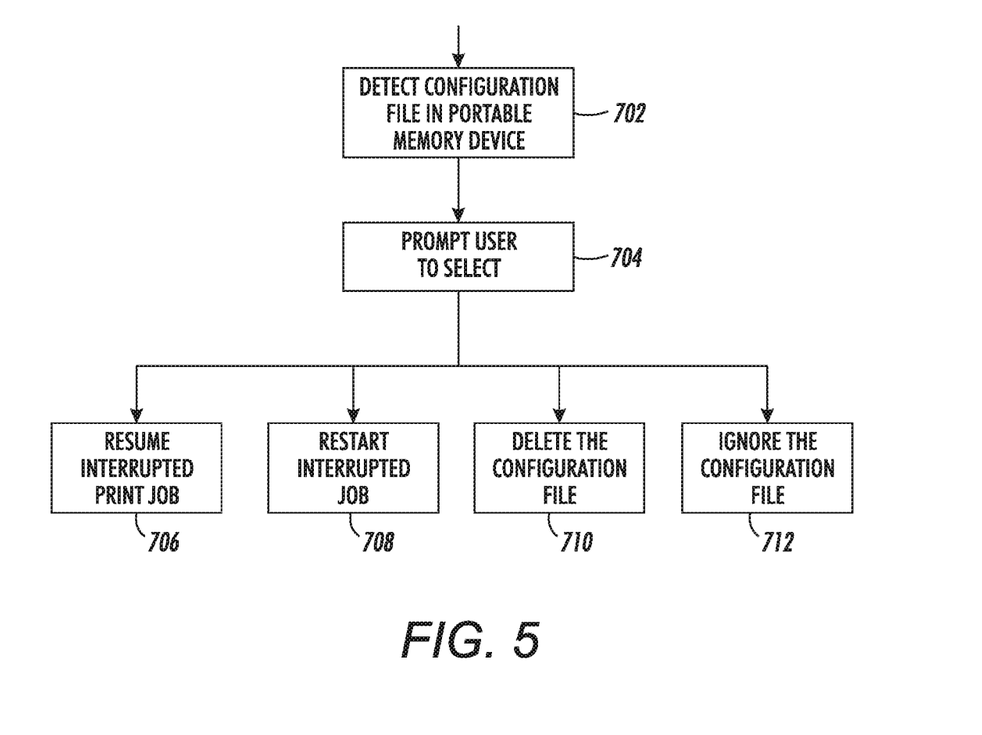
FIG. 5 illustrates a diagram of a process of processing a user selection in a print device according to some embodiments.

In FIG. 5, in some embodiments, upon detecting a configuration file in the portable the print device 702, the print device may prompt the user to make a selection 704. In some embodiments, the user may be prompted to make a selection of user actions in a local user interface (LUI). In some embodiments, the user may be prompted by text message or by voice. The print device may also be configured to receive user selection in various ways, such as a push of a button in LUI or one or more other user interactions in LUI, or a voice command. In some embodiments, the LUI may be displayed on the print device. In some embodiments, the LUI may be transmitted to and displayed on the portable memory device that has a display screen (for example, a mobile phone).

In some embodiments, the print device may prompt the user to resume the interrupted print job 706. In response to this user selection, the print device may extract information from the configuration file and use the extracted information to resume the interrupted print job, as previously described. The print device may also prompt the user to restart the interrupted print job 708 from the beginning. In response to this user selection, the print device may proceed with resuming the interrupted job by printing the document file from the beginning. Additionally, the print device may also delete the associated configuration file from the portable memory device once the interrupted print job is resumed and complete. The print device may also prompt the user to delete the configuration file 710 without printing any document. In response to this user selection, the print device may proceed with deleting the configuration file from the portable memory device. The print device may also prompt the user to ignore the configuration file 712. In response to this user selection, the print device may perform nothing, such as resuming to its previous state before detecting the portable memory device or proceeding to an idle state.

In the above illustrated embodiments, the print device may resume an interrupted print job in the same print device that had originally started the print job, or in a different print device. For example, a print job that is interrupted in print device A may be resumed in print device B. The detailed embodiments will be further described with an example in FIG. 6.

Figure 6:
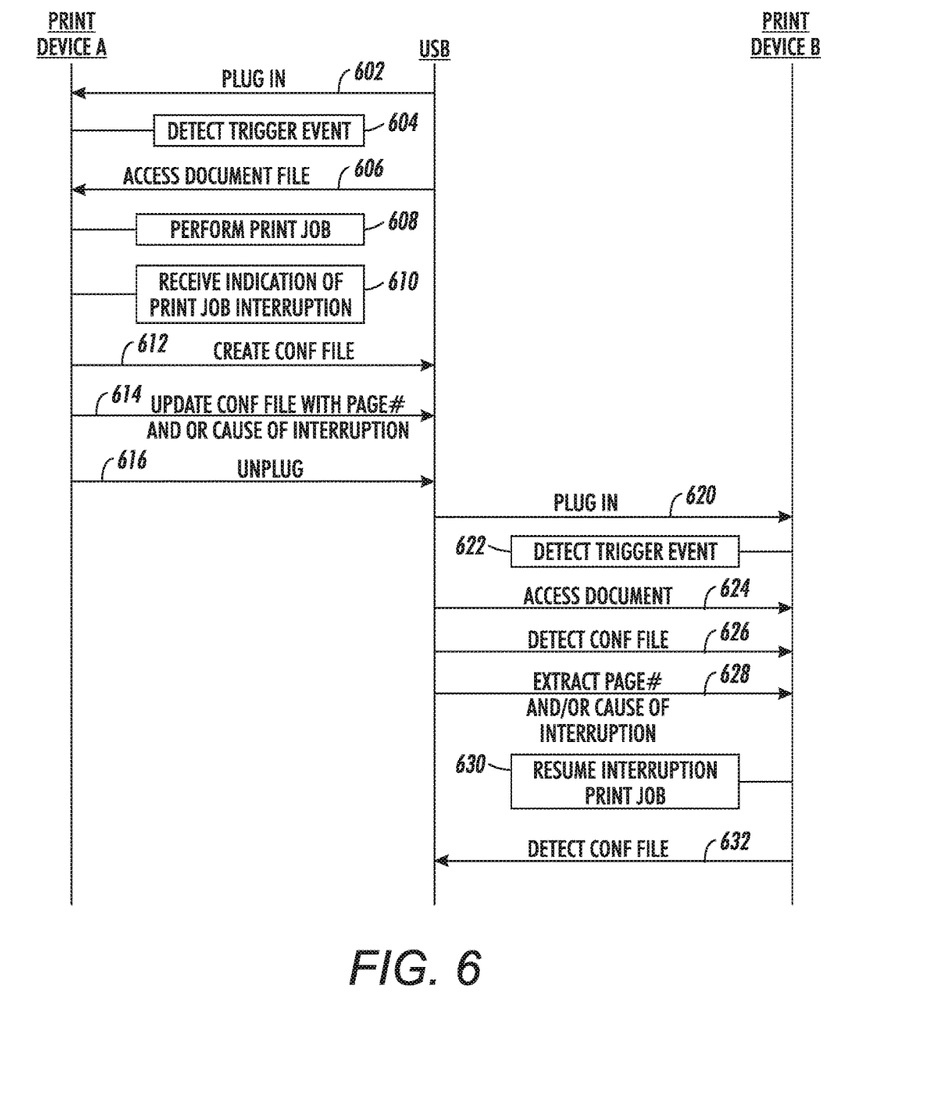
FIG. 6 illustrates a diagram of a process of resuming a print job on a different print device according to some embodiments.
Figure 7:
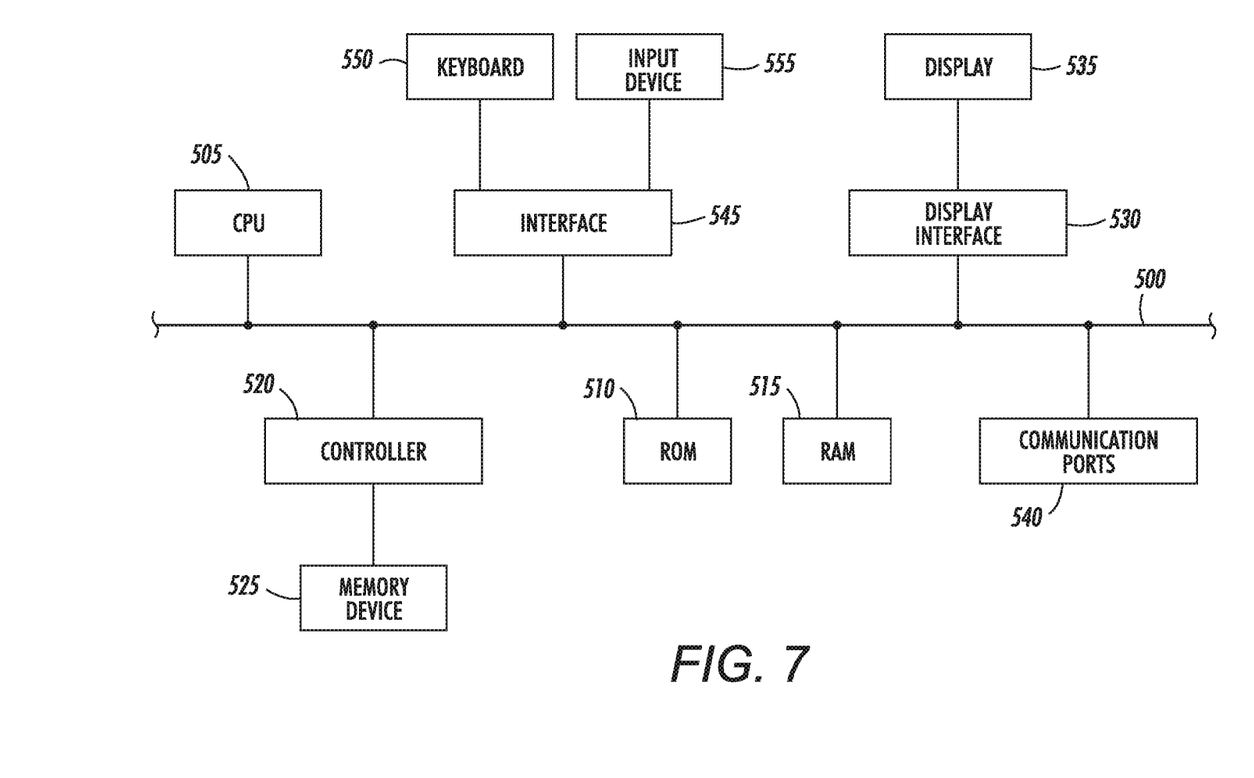
FIG. 7 is a block diagram of elements of a computing device on which the various systems and methods in this document could be implemented.

In FIG. 6, according to some embodiments, upon detecting that a user is plugging in or coupling a portable memory device 602, print device A may detect a trigger event 604 indicating that a portable memory device is plugged in or communicatively coupled. Print device A may access one or more document files to be printed in the portable memory device 606, and perform one or more print jobs 608 to print the documents stored in the portable memory device. During printing, device A may receive an indication of a print job interruption 610, and subsequently create 612 or update 614 a configuration file with the page number at which the interruption occurred, and/or information about the cause of the interruption or job attributes of the interrupted print job. Upon such interruption, the user may unplug or decouple the portable memory device from the print device A 616. Optionally, when the interruption occurs, the print device may prompt the user that the print job has been interrupted, and prompt the user to unplug the portable memory device, correct some conditions that have caused the interruption of the print job, or resume printing in a different device.

In some embodiments, the user may take the unplugged portable memory to any other print device or the same print device at a later time. In a non-limiting example, the user may plug in or pair the portable memory device to print device B 620. Print device B may detect a trigger event 622 indicating that a portable memory device has been plugged in or communicatively coupled. As previously described (in FIG. 3), print device B may proceed to access one or more documents stored in the portable memory device 624, and detect a configuration file 626 that contains information about a previously interrupted print job associated with the one or more documents stored in the portable memory device. Print device B may proceed to extract from the configuration file the page number at which the interrupted print job occurred, and/or information about the cause of the interruption or job attributes of the interrupted print job 628. Print device B may use the extracted information from the configuration file and resume the interrupted print job in device B 630 in a similar manner as described above. Optionally, upon completing the resumed print job, device B may delete the configuration file 632.

Alternatively, and/or additionally, print device B may also be capable of detecting an interruption of a print job as described above in embodiments of FIGS. 4-5. Alternatively, and/or additionally, print device A may also be capable of detecting an interruption of a print job that occurred in the print device A itself at a previous time, and resume that interrupted print job.

FIG. 6 depicts an example of internal hardware that may be included in any of the electronic components of the system, the print device or another device in the system such as the print devices 120, 121 in FIG. 1. An electrical bus 500 serves as an information highway interconnecting the other illustrated components of the hardware. Processor 505 is a central processing device of the device, configured to perform calculations and logic operations required to execute programming instructions. As used in this document and in the claims, the terms "processor" and "processing device" may refer to a single processor or any number of processors or processor cores in one or more processors. The device may include read only memory (ROM) 510, random access memory (RAM) 515, or other types of memory devices, such as flash memory, hard drives and other devices capable of storing electronic data. A memory device may include a single device or a collection of devices across which data and/or instructions are stored.

An optional display interface 530 may permit information from the bus 500 to be displayed on a display device 545 in visual, graphic or alphanumeric format. An audio interface and audio output (such as a speaker) also may be provided. Communication with external devices may occur using various communication ports or devices 540 such as a portable memory device reader/writer, a transmitter and/or receiver, an antenna, an RFID tag and/or short-range or near-field communication circuitry. The communication device 540 may be attached to a communications network, such as the Internet, a local area network or a cellular telephone data network.

The hardware may also include a user interface sensor 545 or LUI that allows for receipt of data from input devices 550 such as a keyboard, a mouse, a joystick, a touchscreen, a remote control, a pointing device, a video input device (camera) and/or an audio input device (microphone). Various methods of activation, validation and/or authorization described in this document may be performed by the central processing device 505 or a controller 520.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

The invention claimed is:

1. A method for automatically printing a document in a document printing system, comprising:
  detecting, by a processing device of a print device, a trigger event by determining that a portable memory device has become communicatively connected to a port of the print device;
  upon detecting the trigger event, by the processing device:
    accessing a document file stored in the portable memory device, wherein the document file comprises a digital representation of a document to be printed,
    detecting whether a configuration file associated with the document file is stored in the portable memory device,
    if the configuration file exists in the portable memory device, automatically printing the document file by:
      determining that the configuration file contains information about an interrupted print job of the document file,
      extracting, from the configuration file, at least a page number of the document at which an interruption of the interrupted print job occurred, and
      causing a print engine of the print device to automatically resume the interrupted print job from the page number of the document at which the interruption occurred.

2. The method of claim 1, further comprising:
  if no configuration file exists in the portable memory device, causing the print engine of the print device to automatically print the document from a first page of the document.

3. The method of claim 1, further comprising:
  receiving by the print device, an indication of an interruption of a current print job of the document file stored in the portable memory device;
  upon receiving the indication, creating or updating the configuration file in the portable memory device so that the configuration file records at least a current page number at which the current print job was interrupted.

4. The method of claim 1, further comprising, after automatically resuming the interrupted print job, deleting the configuration file from the portable memory device after the document is completely printed.

5. The method of claim 3, further comprising:
  extracting from the configuration file information about a cause of the interruption of the interrupted print job or job attributes of the interrupted print job, wherein resuming the interrupted print job also uses the information about the cause of the interruption of the interrupted print job or the job attributes of the interrupted print job; and
  upon receiving the indication of an interruption of the current print job, further updating the configuration file in the portable memory device so that the configuration file records a cause of the interruption of the current print job or job attributes of the interrupted current print job.

6. The method of claim 5, wherein resuming the interrupted print job further comprising comparing the cause of the interruption of the interrupted print job or the job attributes of the interrupted print job with status of the print device to determine whether a condition that has caused the interruption of the interrupted print job is also present in the print device; and
  upon determining that the condition that has caused the interruption of the interrupted print job exists in the print device, suspending resuming the interrupted print job.

7. The method of claim 6, wherein suspending resuming the interrupted print job also comprises notifying a user of the condition that has caused the interruption of the interrupted print job.

8. The method of claim 5, wherein the cause of the interruption of the interrupted print job comprises one or more of the following: paper jam, print medium not available, low toner, stapler empty or hole puncher not available.

9. The method of claim 1, further comprising:
  if the configuration file exists in the portable memory device, before automatically printing the document file, prompting a user for a selection of actions to which the print device will respond by:
    resuming the interrupted print job based on the information contained in the configuration file,
    deleting the configuration file and printing the document from a first page of the document,
    deleting the configuration file, or
    ignoring the configuration file.

10. The method of claim 3, further comprising, by a processing device of a second print device:
  detecting that the portable memory device has become communicatively connected to a port of the second print device and that the portable memory device contains the configuration file that includes the information about the interrupted print job;
  extracting from the configuration file at least the page number at which the interruption of the interrupted print job occurred; and
  automatically causing a print engine of the second print device to resume the interrupted print job from the page number at which the interruption occurred.

11. The method of claim 10, further comprising extracting from the configuration file information about a cause of the interruption of the interrupted print job or job attributes of the interrupted print job, wherein resuming the interrupted print job of the document file by the second print device also uses the information about the cause of the interruption of the interrupted print job or the job attributes of the interrupted print job.

12. The method of claim 10, further comprising, by the processing device of the second print device:
  receiving an indication of an interruption of a current print job of the document file stored in the portable memory device; and
  updating the configuration file in the portable memory device so that the configuration file records at least a current page number at which the current print job was interrupted, and a cause of the interruption of the current print job or job attributes of the interrupted current print job.

13. A document printing system, comprising a print device, wherein the print device comprises:
  a processing device;
  a print engine;

a port configured to communicatively connect to a portable memory device;

an event triggering circuit configured to detect that a portable memory device is communicatively connected to the port; and non-transitory computer readable storage medium containing programming instructions configured to cause the processing device to:

detect a trigger event by determining that a portable memory device has become communicatively connected to the port of the print device;

upon detecting the trigger event:

access a document file stored in the portable memory device, wherein the document file comprises a digital representation of a document to be printed,         detect whether a configuration file associated with the document file is stored in the portable memory device,         if the configuration file exists in the portable memory device, automatically print the document file by:

determining that the configuration file contains information about an interrupted print job of the document file,             extracting, from the configuration file, at least a page number of the document at which an interruption of the interrupted print job occurred, and             causing the print engine of the print device to automatically resume the interrupted print job from the page number of the document at which the interruption occurred.

14. The system of claim 13, further comprising additional programming instructions configured to cause the processing device of the print device to:

if no configuration file exists in the portable memory device, cause the print engine of the print device to automatically print the document from a first page of the document.

15. The system of claim 13, further comprising additional programming instructions configured to cause the processing device of the print device to:

receive an indication of an interruption of a current print job of the document file stored in the portable memory device;

upon receiving the indication, create or update the configuration file in the portable memory device so that the configuration file records at least a current page number at which the current print job was interrupted.

16. The system of claim 15, wherein:

the programming instructions for extracting at least a page number from the configuration file comprise programming instructions configured to additionally extract from the configuration file information about a cause of an interruption of the interrupted print job or job attributes of the interrupted print job, the programming instructions for resuming the interrupted print job also comprise programming instructions configured to use the information about the cause of the interruption of the interrupted print job or the job attributes of the interrupted print job in resuming the interrupted print job, and the programming instructions for creating or updating the configuration file also comprise programming instructions configured to cause the processing device of the print device to record a cause of the interruption of the current print job or job attributes of the interrupted current print job.

17. The system of claim 16, wherein the programming instructions for resuming the interrupted print job also comprise programming instructions configured to:

compare the cause of the interrupted print job or the job attributes of the interrupted print job with status of the print device to determine whether a condition that has caused the interruption of the interrupted print job is also present in the print device; and     upon determining that the condition that has caused the interruption of the interrupted print job exists in the print device, suspend resuming the interrupted print job.

18. The system of claim 16, wherein the cause of the interruption of the interrupted print job comprises one or more of the following: paper jam, print medium not available, low toner, stapler empty or hole puncher not available.

19. The system of claim 13, further comprising a second print device, the second print device comprising:

a processing device;

a print engine;

a port configured to communicatively connect to the portable memory device;

an event triggering circuit configured to detect that the portable memory device is communicatively connected to the port of the second print device; and     non-transitory computer readable storage medium containing programming instructions configured to cause the processing device of the second print device to:

detect that the portable memory device has become communicatively connected to the port of the second print device and that the portable memory device contains the configuration file that includes the information about the interrupted print job,         extract from the configuration file at least the page number at which the interruption of the interrupted print job occurred, and         automatically cause the print engine of the second print device to resume the interrupted print job from the page number at which the interruption occurred.

20. The system of claim 19, wherein the second print device further comprises additional programming instructions configured to cause the processing device of the second print device to:

receive an indication of an interruption of a current print job of the document file stored in the portable memory device; and     update the configuration file in the portable memory device so that the configuration file records at least a current page number at which the current print job was interrupted, and a cause of the interruption of the current print job or job attributes of the interrupted current print job.

\* \* \* \* \*